United States Patent Office 3,410,762
Patented Nov. 12, 1968

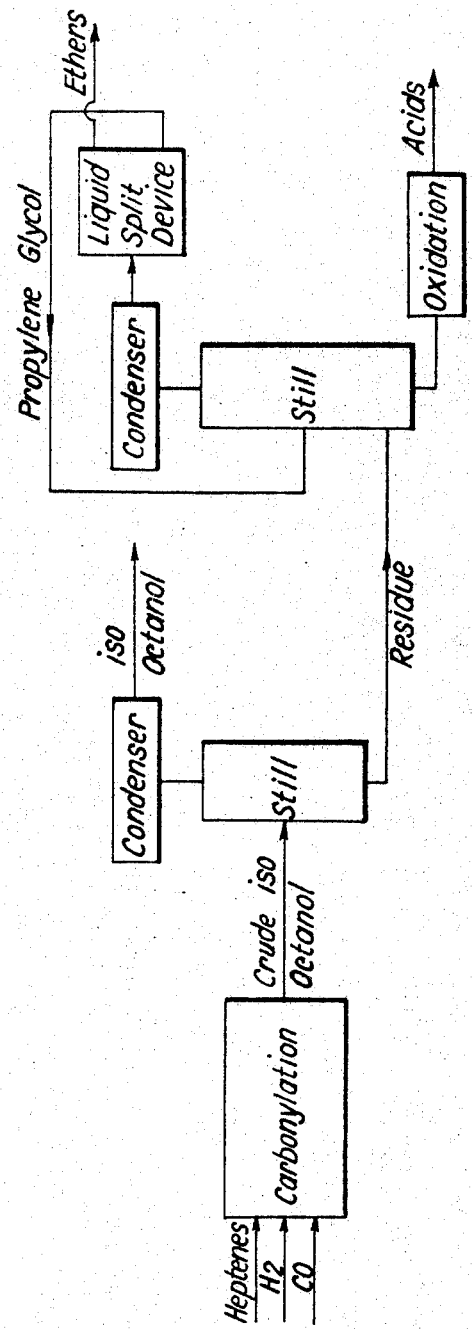

3,410,762
SEPARATION OF ETHERS
Fred Dean, Norton-on-Tees, England, assignor to Imperial Chemical Industries Limited, London, England, a corporation of Great Britain
Continuation-in-part of application Ser. No. 296,442, July 22, 1963. This application Apr. 14, 1967, Ser. No. 630,816
Claims priority, application Great Britain, July 27, 1962, 28,940/62
5 Claims. (Cl. 203—64)

ABSTRACT OF THE DISCLOSURE

High boiling residues produced in the distillation of crude alcohols produced by the carbonylation of olefines, are freed from ethers by azeotropic distillation with a lower diol.

---

This is a continuation-in-part of United States application Ser. No. 296,442, filed on July 22, 1963, now abandoned.

This invention relates to the separation of ethers.

It is known that olefines may be reacted with carbon monoxide and hydrogen in the presence of a suitable catalyst for example, a cobalt containing catalyst, to give aldehydes and alcohols and that the aldehydes may be subsequently hydrogenated to alcohols. This process is generally known as the carbonylation of olefines.

The crude alcohol-containing product of the carbonylation process is usually distilled and the desired alcohols recovered as a distillate, leaving a distillation residue consisting of a mixture of a wide variety of compounds for example, ethers, higher alcohols and esters. Normally this distillation residue contains 10 to 90% by volume of ethers in which the alkyl groups correspond to the primary product alcohol of the carbonylation process, i.e., alcohols containing $n+1$ carbon atoms where $n$ is the number of carbon atoms in the olefines carbonylated. The residue also contains: 1 to 25%, normally 5 to 10%, by volume of $C_{n+1}$ alcohols; 10 to 60% of $C_{2n+2}$ alcohols (dimers) derived by condensation of two primary product alcohols; and esters of the $C_{n+1}$ alcohol and carboxylic acids corresponding to the $C_{n+1}$ alcohol. The $C_{2n+2}$ alcohols have a structure in which an alkyl group corresponding to a primary product alcohol is substituted at the alpha-position of the same or a different primary product alcohol, e.g., $RCH_2CH_2CHRCH_2OH$ where $RCH_2CH_2OH$ is the primary product alcohol. In addition the residue contains ethers and esters derived from the $C_{2n+2}$ alcohols.

A typical product consists of 60% of ethers, 25% of the substituted alcohols, 10% of the alcohol product and 5% of esters by volume.

When, for example, commercially available mixtures of heptenes are carbonylated, a wide variety of alcohols are produced, as such heptenes are normally made by reacting propylene with mixtures of butenes. The alcohol product normally consists of 20 to 25% of mono-methyl heptanols comprising 3,4,5- and 6-methyl heptan 1-ols, and 75 to 80% of dimethyl hexanols comprising mainly 4,5- and 3,4-dimethyl hexanol-1 and minor amounts of 3,5-dimethyl hexanol-1.

The distillation residue has commercial value since for example, it can be oxidised with caustic soda to give acids suitable for the manufacture of paint driers; it is however, desirable to remove the ethers before applying this oxidation process.

It is frequently difficult to separate the ethers of the aforementioned distillation residue because of the large number of compounds present having very similar boiling points. For instance fractional distillation of the distillation residue is usually impracticable or impossible.

The present invention provides a process for separating ethers from high-boiling residues, from which it is difficult to separate the ethers by normal distillation, which residues are obtained in the distillation of crude alcohol produced by the carbonylation of olefines, by subjecting the said residues to azeotropic distillation with a diol having 2 to 4 carbon atoms.

Residues difficult to separate by normal distillation but from which ethers may be suitably separated in accordance with the present invention are those boiling above 200° C. and especially above 250° C. at atmospheric pressure.

Before being subjected to the process of the invention the high boiling residues may be first distilled to remove as a distillate, any remaining lower boiling alcohols which are the primary alcohol product of the carbonylation process.

A variety of diols may be used in the process of the invention examples being ethylene glycol, the propanediols and the butanediols. It is preferred to use 1:2-propanediol because of its low boiling point.

A small amount of a diol is capable of effecting the separation of a relatively large amount of ethers. The minimum amount of the diol required depends upon the dynamic hold-up of the particular distillation column used. Generally speaking the amount of the diol may be 1–20% for example 10% by volume of the ethers to be separated.

It is very desirable that the azeotropic distillation is conducted under reflux conditions in order to achieve efficient separation of the ethers. The reflux ratio required depends on the characteristics of the distillation apparatus. It may be for example 1:1 but higher or lower reflux ratios may be used. The reflux may be the azeotrope or azeotropes formed during the distillation or it may be the diol for example diol separated from the azeotrope.

The distillate leaving the distillation column is condensed to form a condensate which separates into an ether-rich layer and a diol-rich layer. The ether-rich layer on cooling may contain a small proportion of diol, usually less than 1%, which may be removed for example, by washing with water, and the ethers then purified by distillation or other means. The diol-rich layer may be returned wholly or in part to the distillation column as reflux or to the boiler of the distillation column.

The distillation residue containing mainly higher molecular weight alcohols and glycol may be treated to remove the diol for example by distillation. The remaining material corresponds essentially to the higher alcohol component of the original residues together with the ester component thereof, and a small amount of ethers constituting normally at most 5% by volume, and often as little as 1% by volume. This material is very suitable for oxidation to acids. Such oxidation may be suitably performed with caustic soda.

The figure is a diagrammatic illustration of an embodiment of the present process and is labeled to render the figure self-explanatory.

The process of the invention is applicable to the separation of ethers from the high-boiling residues obtained by the distillation of crude alcohols produced in the carbonylation of a wide variety of olefines or olefine mixtures which may be aliphatic olefines such as heptenes, di-isobutylene, propylene dimer or alicyclic olefines or aromatic olefines. The high-boiling residues obtained in the carbonylation of two or more different olefine feedstocks may be mixed before treatment according to the process of the invention.

Example 1

1 litre of a distillation residue obtained by distilling crude iso-octanol produced by the carbonylation of a commercial mixture of heptenes was introduced into the boiler of a 2-litre glass still fitted with a 25-plate Oldershaw column. The residue contained 12% by weight of iso-octanols (mainly 4,5- and 3,4-dimethyl hexanols-1, with some 3-, 4-, 5-, and 6-methyl heptanols), 30% by volume of $C_{16}$ alcohols corresponding to the above iso-octanols substituted in the α position by alkyl groups corresponding to the above iso-octanols, for example the alcohol of formula:

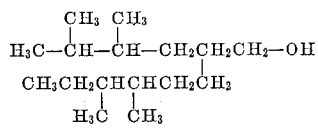

8% by volume of predominantly $C_{16}$ aliphatic esters in which the alcohol and acid moieties are derived from iso-octanols; for example the 5-methyl heptyl ester of 3,4-dimethyl hexanoic acid, and 50% by volume of predominantly $C_{16}$ aliphatic ethers, having alkyl groups corresponding to the iso-octanols, for example di-4,5-dimethyl hexyl ether. The column was attached to a condenser and a magnetic liquid split device and there was a cooler and a liquid decanter in the exit line. The boiler was heated by a heating mantle.

100 ml. iso-octanol were first distilled from the distillation residues using a reflux ratio of 10:1. The final still head vapour temperature was 225° C.

200 ml. propylene glycol were then added to the contents of the boiler and 30 ml. propylene glycol placed in the decanter. Distillation was then continued at a reflux ratio of 1:1 and a still head temperature of 180°–182° C. The ether/propylene glycol azeotrope obtained as a distillate contained about 25% by volume of ethers. The azeotrope which was taken off was cooled to ambient temperature and allowed to separate in the decanter into an ether-rich layer and a glycol-rich layer which was returned directly to the boiler. After 8 hours the distillation of ethers had substantially ceased and the ether layer, which contained less than 1% of propylene glycol, was washed twice with water and separated. 450 ml. ethers were obtained boiling within the range 236°–281° C. and having a hydroxyl value of less than 5 mg. KOH/gm., an acid value of 0.3 mg. KOH/gm. and an ester value of nil.

The residual liquid remaining in the boiler was then distilled to remove propylene glycol and recover a product corresponding to the aforementioned $C_{16}$ alcohol and ester components but containing about 5% of ethers, which was then satisfactorily oxidised to acids by means of fused caustic soda.

Example 2

The process described in Example 1 was repeated using ethylene glycol instead of propylene glycol. 480 ml. of ethers were obtained, leaving a residue containing about 2% of ethers.

I claim:

1. A process in which the high-boiling distillation residue containing ethers, alcohols and esters produced by distilling off alcohols from the product obtained in carbonylating a mixture of heptenes is rendered suitable for use in the production of paint driers, which process comprises removing dioctyl ethers from the said residue by azeotropic distillation with an aliphatic diol having from 2 to 4 carbon atoms whereby said ethers are separated from said residue as an azeotrope with said diol.

2. A process for removing aliphatic ethers from high-boiling distillation residues produced by distilling alcohols from a crude product obtained in carbonylating olefines to produce primary product alcohols, which residues comprise from 10 to 90% by volume of aliphatic ethers, the alkyl groups of which ethers correspond to those of said primary product alcohols, 1 to 25% by volume of the said primary product alcohols, and 10 to 60% by volume of dimer alcohols in which an alkyl group corresponding to the said primary product alcohol is substituted at an alpha position of a primary product alcohol, together with esters of the said primary product alcohols with carboxylic acids corresponding to the said primary product alcohols, which process comprises azeotropically distilling said residues with an aliphatic diol having 2 to 4 carbon atoms, whereby said aliphatic ethers are removed from said residue as an azeotrope with said diol.

3. A process according to claim 2 in which the residues boil above 250° C., under atmospheric pressure.

4. A process as claimed in claim 1 in which any lower boiling alcohols which are the primary product of the carbonylation process are substantially completely removed by normal distillation prior to azeotropic distillation of the residue with the diol.

5. A process as claimed in claim 1 in which the distillate is separated into an ether-rich layer and a diol-rich layer, and at least part of the diol-rich layer is returned to a distillation device used in the azeotropic distillation.

References Cited

UNITED STATES PATENTS

| | | | |
|---|---|---|---|
| 2,717,271 | 9/1955 | Rowe | 260—616 |
| 2,779,720 | 1/1957 | Tanona | 260—616 |
| 2,802,846 | 8/1957 | Mertzweiller | 260—638 |
| 2,894,990 | 7/1959 | Wennerberg et al. | 260—638 |
| 2,927,064 | 3/1960 | Luzader et al. | 203—64 |

WILBUR L. BASCOMB, JR., *Primary Examiner.*